US007843854B2

(12) United States Patent
VanZante

(10) Patent No.: US 7,843,854 B2
(45) Date of Patent: Nov. 30, 2010

(54) NETWORK LOOP DETECTION USING KNOWN STATIC ADDRESSES

(75) Inventor: Craig VanZante, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1229 days.

(21) Appl. No.: 11/346,916

(22) Filed: Feb. 1, 2006

(65) Prior Publication Data

US 2007/0177661 A1    Aug. 2, 2007

(51) Int. Cl.
H04L 12/28 (2006.01)
(52) U.S. Cl. ............................. 370/256; 370/408
(58) Field of Classification Search ............ None
See application file for complete search history.

(56) References Cited

U.S. PATENT DOCUMENTS

| 6,397,248 B1* | 5/2002 | Iyer ..................... 709/223 |
| 6,628,624 B1* | 9/2003 | Mahajan et al. ......... 370/256 |
| 6,697,339 B1* | 2/2004 | Jain ..................... 370/256 |
| 6,882,630 B1* | 4/2005 | Seaman ................. 370/256 |
| 7,414,984 B2* | 8/2008 | Mack et al. ............ 370/254 |
| 2002/0154606 A1* | 10/2002 | Duncan et al. ......... 370/256 |
| 2002/0196740 A1* | 12/2002 | Lee et al. .............. 370/250 |
| 2005/0220036 A1* | 10/2005 | Sugitani et al. ........ 370/252 |
| 2006/0013141 A1* | 1/2006 | Mutoh et al. ........... 370/241 |
| 2006/0233186 A1* | 10/2006 | Portolani et al. ....... 370/408 |

* cited by examiner

*Primary Examiner*—Dang T Ton
*Assistant Examiner*—Ryan C Kavleski

(57) ABSTRACT

In one embodiment of the invention, a method for detecting a network loop problem in a network, includes: selecting a known static address of a selected device which should normally be detected at not more than one port of a downstream device; determining if the static address is detected in more than one port in a downstream device, wherein the current downstream device includes a first port which normally detects the known static address and a second port; if the static address is detected at the second port of the current downstream device, then determining the connection to the second port and if the connection to the second port is a leaf, then identifying the leaf as a misbehaving node, and if the connection to the second port is not a leaf, then evaluating a next downstream device.

30 Claims, 3 Drawing Sheets

NETWORK LOOP DETECTION USING KNOWN STATIC ADDRESSES

TECHNICAL FIELD

Embodiments of the invention relate generally to communication networks, and more particularly to network loop detection using known static addresses.

BACKGROUND

It is common in present computing environments to connect multiple computing devices and network devices through a communication medium that is commonly referred to as a network. Such networks among devices permit the devices (or users of the devices) to exchange and share information.

A loop in a network creates a never-ending data path, typically resulting in excessive system overhead, connectivity problems, and/or degradation of network performance. Network loops make the network as unusable, and quickly finding the port(s) that causes the loop is critical in order to keep the network as operating.

Some networks run protocols to detect the presence of loops. Two protocols that are used to detect the presence of loops are the Spanning-Tree Protocol (STP) and the Rapid Spanning-Tree Protocol (RSTP). STP is presented in detail in *IEEE Standard for Local and Metropolitan Area Networks—Common Specification, Part 3:Media Access Control (MAC) Bridges* (The Institute of Electrical and Electronics Engineers, Inc., New York, N.Y. 1998). RSTP is presented in detail in *IEEE Standard for Local and Metropolitan Area Networks—Common Specification, Part 3: Media Access Control (MAC) Bridges—Amendment 2: Rapid Reconfiguration*, (The Institute of Electrical and Electronics Engineers, Inc., New York, N.Y. 2001). However, these protocols introduce additional packet traffic to the network, usually require configuration and administration, and usually require periods of down time in the network so that the protocol can determine if a loop is present. This required down time occurs even if it is determined that a loop is not actually present in the network.

An alternative loop detection method is by unplugging the cables in the network until the loop is eliminated. However, this manual and trial-and-error method can take a long period of time to perform and requires the individual to have knowledge of the network topology. Therefore, the current technology is limited in its capabilities and suffers from at least the above constraints and deficiencies.

SUMMARY OF EMBODIMENTS OF THE INVENTION

In one embodiment of the invention, a method for detecting a network loop problem in a network, includes: selecting a known static address of a selected device which should normally be detected at not more than one port of a downstream device; determining if the static address is detected in more than one port in a downstream device, wherein the current downstream device includes a first port which normally detects the known static address and a second port; if the static address is detected at the second port of the current downstream device, then determining the connection to the second port; and if the connection to the second port is a leaf of a tree of the network, then identifying the leaf as a misbehaving node, and if the connection to the second port is not a leaf, then evaluating a next downstream device.

The method may further include at least one of the following steps. If the next downstream device is farther from the root node than expected, then disabling or removing an added extra link to this next downstream device in order to eliminate the loop. If the next downstream device has already been examined, then disabling or removing a link to that next downstream device in order to eliminate the loop is performed. If the next downstream device violates a rule of the network, then disabling or removing a link to that next downstream device in order to eliminate the loop.

The loop problem may, for example, comprise: a network loop formed by a downstream device connected to itself by a cable or other link type, two downstream devices connected by multiple cables or other link types, or a ring of downstream devices each connected to two other downstream devices by a single cable or other link type.

Alternatively or additionally, the loop problem may, for example, comprise: the next downstream devices misbehaving by transmitting the packet with the static address from the next downstream device to the second port of the current downstream device.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Figure 1:
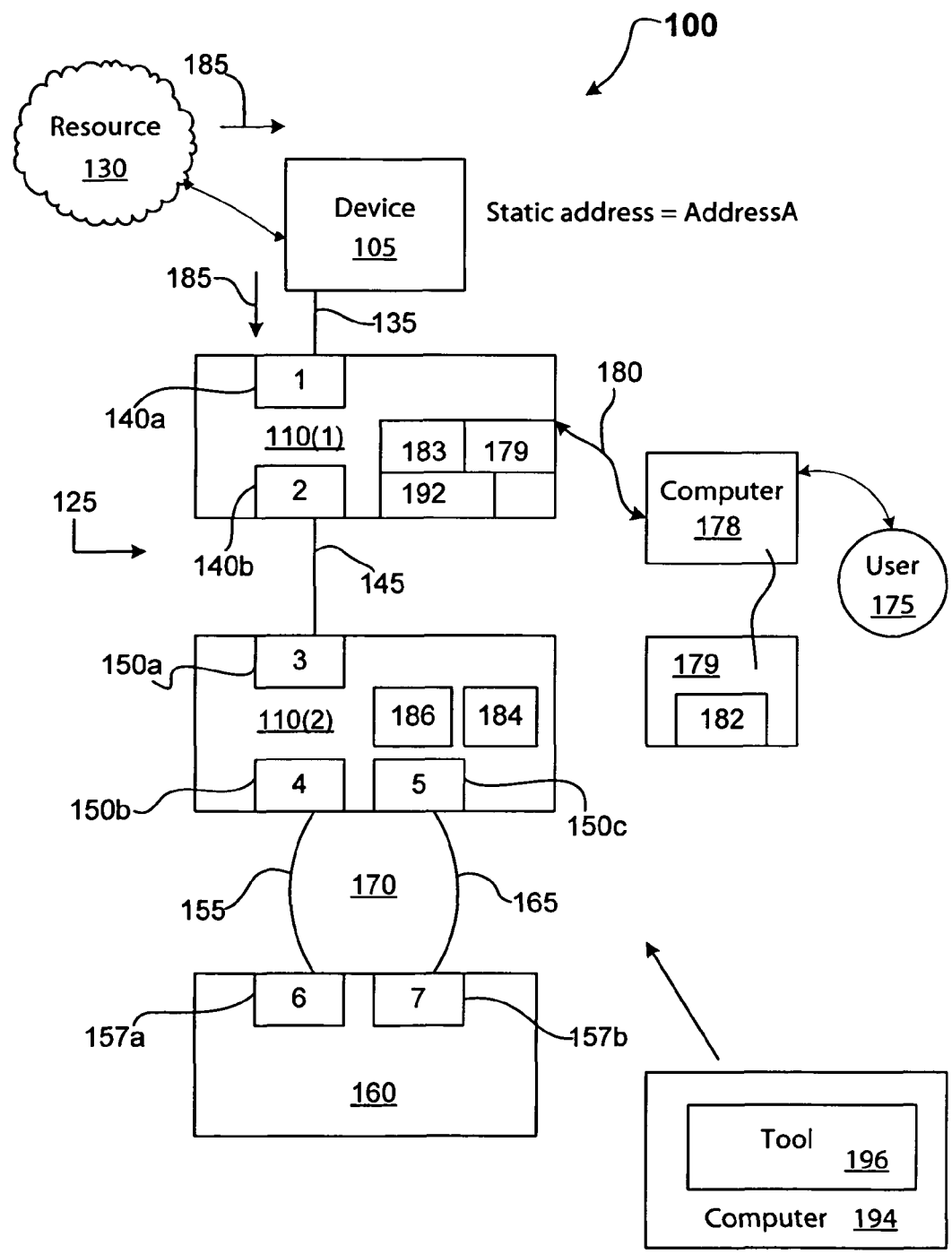
FIG. 1 is a block diagram of an example network that can be used to practice an embodiment of the invention.

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Most networks have at least one device that is known to exist at a certain location on the network. This device may be, for example, an important server or router, and probably would not be a portable laptop computer. In the discussion of embodiments of the invention, this device will be considered as the root device of a tree of network connections. This device typically will also have (or be assigned) a unique address or unique identifier on any network segment to which it is connected. This device may be connected to multiple network segments. Network devices may also handle multiple segments simultaneously. In a switched Ethernet network, a device is typically uniquely identified by a combination of its MAC address and VLAN.

Many network devices have multiple network ports that are used to interconnect other devices that are part of the network. Routers, switches, bridges and repeaters are examples. Many of these devices have knowledge of the identity of devices connected to its ports (possibly for forwarding decisions or just for network management) by examining the identity of the senders of the frames received on each port. If frames from a device are seen on one port and later are seen on another port, then that is considered a move of the device from one location in the network to another location in the network. The root device should not move. If the root device does move, a problem, like, for example, a network loop, address spoofing, or a misbehaving device, is probably occurring.

An embodiment of the invention permits the detection of a network loop problem by use of the following method. The source of the problem can be found by examining a device if the address has moved from a first port to a second port, and determining what is connected to that second port. If the connection is a leaf on the network tree, then that node is misbehaving. In a network tree, a leaf is a node without any downstream nodes (i.e., child nodes). If the connection is not a leaf, then that next downstream device should be examined. If that next downstream device is farther from the root node than expected given the original network topology, then an extra link has been added and should be removed. The link to this next downstream device could be disabled or removed, in order to eliminate the loop though the original network topology might be changed. If the next node has already been examined, then the link to that node is part of the loop and can be disabled, again possibly changing the topology. If the next node violates some other rule of the network (for instance, it may be a device on a network that is not supposed to be connected), then the link could be disabled.

A method provided in accordance with an embodiment of the invention advantageously does not require additional network traffic or network downtime in order to determine if a loop problem is present in the network or if a misbehaving device or another problem is present in the network. Additionally, the method can be used in a network(s) where current loop detection protocols are not in use or are not desirable for use.

FIG. 1 is a block diagram of an example network 100 that can be used to practice an embodiment of the invention. The example network 100 includes a selected device 105 that has a known unique static address ("AddressA" in this example) or unique identifier that is monitored in order to detect the presence of a loop in the network 100 or in order to detect a misbehaving network device that causes a loop effect in the network 100. This static address would normally be detected at not more than one port of a downstream device (e.g., downstream device 110(1) or 110(2)). The selected device 105 will be considered as the root device of a tree of network connections. One or more downstream (i.e., non-root) network devices (generally referred herein as device(s) 110, and specifically referred to as device 110(1) and 110(2) in the example of FIG. 1) are included in the example network 100 of FIG. 1.

Note that the method discussed herein is concerned with non-leaf, non-root devices. If the address moves to a leaf, then the leaf is pruned. In other words, if the address moves to a port that is connected to a leaf on the network tree, then the leaf is a misbehaving node.

The number of downstream network devices 110 in the example network 100 of FIG. 1 may vary in number. For example, only one downstream network device 110 may be implemented in the network 100, or more than two downstream network devices 110 may be implemented in the network 100.

The network device 105 is typically, for example, a router or a server, or another suitable network device. For purposes of explaining the embodiments of the invention, the known elements in a router (e.g., processor, ports, and other elements) are not shown in the drawings. The network device 105 generates network packet traffic so that any movement of the static address AddressA in the ports of any downstream device 110 can be detected. The network traffic permits the user to observe/detect the movement of AddressA when the user checks the address tables in the switches 110(1) and 110(2). Note also that the transmission of a single packet is enough to detect a loop. The packet can exit the node and start traversing the loop, causing moves of the address. As discussed in detail below, a loop problem (e.g., a loop or a misbehaving device having a loop effect) in the network 100 is detected by observing the movement of the static address AddressA. Corrective action is then taken after the loop or misbehaving device has been detected or identified, as described in detail in the below examples.

The static address AddressA is typically a MAC (Media Access Control) address of the selected device 105 and this MAC address is indicated in Ethernet frames (packets 185) that are transmitted by the selected device 105. In a local area network (LAN) or other network, the MAC address is a network device's unique hardware number. On an Ethernet LAN, the MAC address is the same as the Ethernet address of the network device. When a network device is connected to a wide area network (e.g., Internet), a correspondence table relates the network device's IP (Internet Protocol) address to the network device's physical (MAC) address on a local area network. MAC addresses are used at the data link layer (layer 2) of the Open Systems Interconnection (OSI) model which is the standard model of network programming.

As an example, if the device 105 is a router, then the device 105 can permit a local network 125 to communicate with a resource 130. The local network 125 may be, for example, a local area network (LAN), a private network, or another suitable type of local communication network. The resource 130 may be, for example, a wide area network such as the Internet or another suitable type of network resource. The device 105 is not limited to any particular type of network device, and can be other types of devices such as, for example, servers or network switches or other devices.

A downstream network device (e.g., device 110(1) or/and device 110(2)) is typically, for example, a switch, router, bridge, repeater, or other suitable types of devices. The downstream devices 110 will also be referred to as switches 110, for purposes of explaining the operation of embodiments of the invention. For purposes of explaining the embodiments of the invention, the known elements in a switch 110 (e.g., switch controller, memory, and other elements) are not shown in the drawings. As known to those skilled in the art, a switch is a device that filters and forwards packets between Local Area Network (LAN) segments. Switches operate at the data link layer (layer 2) and sometimes at the network layer (layer 3) of the OSI Reference Model and therefore typically support any packet protocol.

Figure 2:
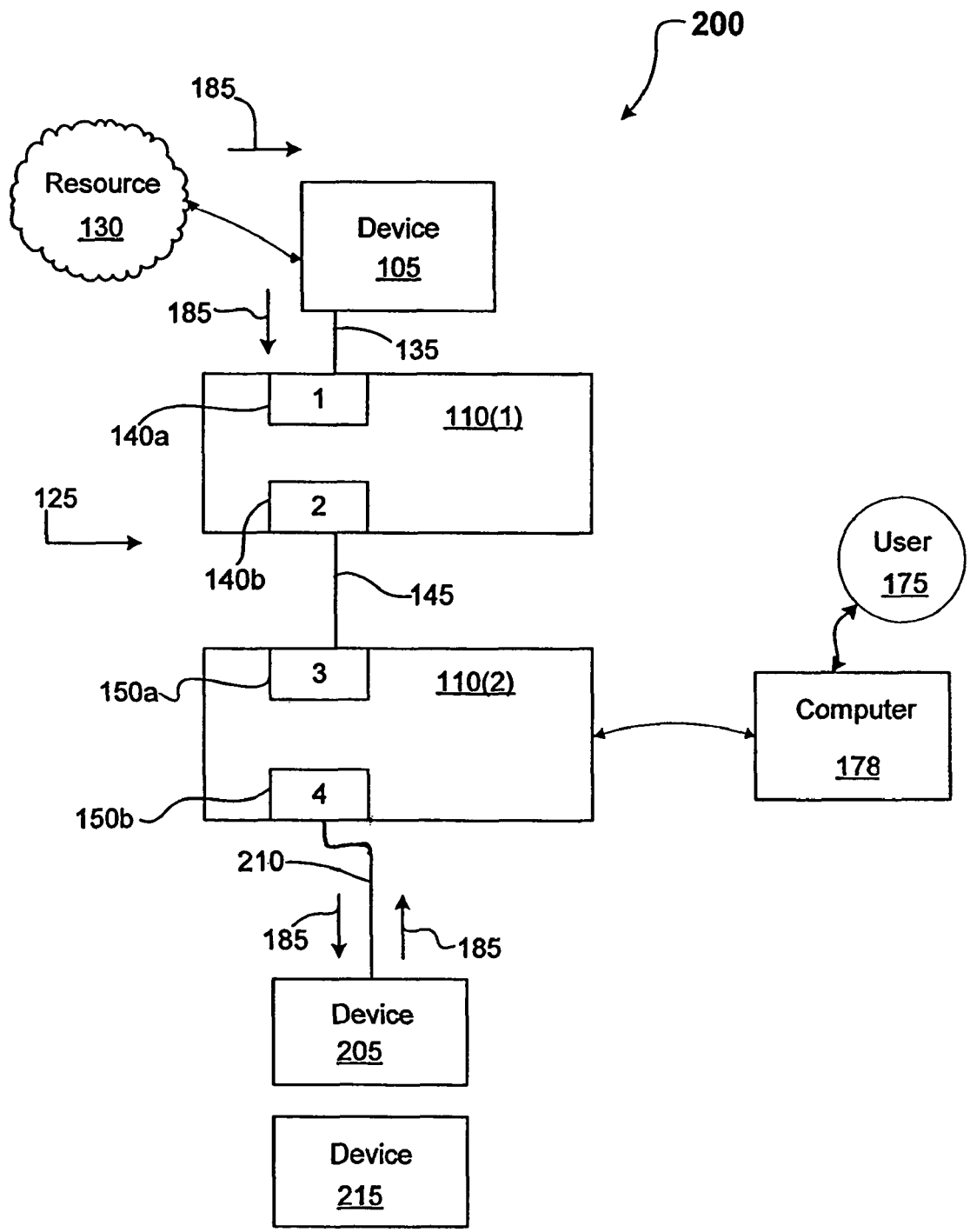
FIG. 2 is a block diagram of another example network that can be used to practice another embodiment of the invention.

In the examples discussed in FIGS. 1 and 2, the downstream network devices 110 are assumed to be switches 110. However, the downstream network devices 110 can be other suitable types of devices in a network, as long as a user 175 can observe the movement of the AddressA in the ports of the downstream network devices 110.

Assume that the selected device 105 has a static address which will be referred to as "AddressA". In practice, the static address AddressA may be an Ethernet MAC address such as, for example, 08:00:09:f8:52:04 or in other suitable format.

Assume further, in the example network of FIG. 1, that device 105 is connected by link 135 to port (1) 140*a* of the switch 110(1). Therefore, in the example network 100 of FIG. 1, the port (1) of the device 110(1) would normally detect the known static address "AddressA" of the selected device 105. The port (2) 140*b* of the switch 110(1) is connected via link 145 to a port (3) 150*a* in the switch 110(2). Port (4) 150*b* in the switch 110(2) is connected via link 155 to a port (6) 157*a* in a device 160. As an example, the device 160 may be a computer or workstation or any other suitable device that can be connected to the network system 100. Port (5) 150*c* in the switch 110(2) is connected via link 165 to a port (7) 157*b* in the device 160. Therefore, the switch 110(2), device 160, and links 155 and 165 form a loop 170 in the network 100. The loop 170 may be formed, for example, because a user of the device 160 may have inadvertently connected the links 155 and 165 to the device 160. The loop problem in the network 100 can cause degradation in network performance. For example, the user of the device 160 may not be able to connect to the resource 130 which may be a wide area network such as the Internet.

The links 135, 145, 155, and 165 may be any suitable network communication link such as, for example, cables or other suitable types of communication links.

The loop 170 can be eliminated based on the following method, in accordance with an embodiment of the invention. A network personnel (user) 175 can connect a computer 178 via link 180 (e.g., serial cable) to the switch 110(1). The computer 178 will display standard switch information 182 which is accessible by the computer 178 via a user interface 179 (typically, a text-based user interface) in the switch 110 (1). Therefore, the computer 178 can be used to query the switch 110(1) to determine which ports in the switch 110(1) received a packet 185 with a source address of AddressA. In other words, the packet 185 is a packet that originated from the device 105. When a query from the computer 178 is sent to a standard address table 183 in the switch 110(1) (where the table 183 indicates the addresses received by the switch 110 (1) ports and other information), the user 175 observes from the user interface 182 about the particular ports 140 that has detected the AddressA. Typically, the user interface 179 will indicate, based on the network configuration in the FIG. 1 example, that the packet 185 was received on port (1) 140*a* of switch 110(1), which is a normal behavior in the topology in FIG. 1. Therefore, AddressA is recorded on port (1) 140*a* by use of the standard address table 183 which indicates the addresses received by the switch's ports and other information. The address table 183 in a switch is used by the switch to forward (bridge) a packet from an input port to a proper output port of the switch, so that the packet is eventually transmitted to the packet destination.

Assume that, at a subsequent time, the user interface 179 now indicates that port (2) 140*b* of switch 110(1) has detected (received) the packet 185 with the source AddressA. Therefore, AddressA is detected and recorded on (i.e., has moved to) port (2) 140*b* of switch 110(1). However, port (2) 140*b* of switch 110(1) is connected to the switch 110(2) which does not have a static address of AddressA. Therefore, since AddressA has moved from the proper port (1) to the port (2) in the switch 110(1), a potential loop problem (e.g., an actual loop as shown in FIG. 1 or a misbehaving device causing a loop effect as shown in FIG. 2) is present on the network 100.

By viewing the network 100 topology in a network map, the user 175 can see that switch 110(1) is connected to switch 110(2). The user can connect a computer 178 to a user interface 184 of switch 110(2). In response to a query from the user 175, the user interface 184 may indicate that AddressA was detected on port (3) 150*a* of switch 110(2), and this is a proper condition because packet 185 is received via port (3) 150*a* from switch 110(1). As similarly mentioned above, the particular addresses that are detected in the ports 150 of the switch 110(2) can be recorded in an address table 186 in the switch 110(2). However, subsequent user queries to the user interface 184 may indicate that AddressA has been recorded on port (4) 150*b* and/or port (5) 150*c* of switch 110(2). This movement of AddressA from port (3) to port (4) or/and to port (5) is an indication to the user 175 of a loop problem because port (4) and port (5) should not be recording AddressA. As an example, the AddressA is recorded at port (4) when the packet 185 transmits from port (5) of switch 110(2) via cable 165 to port (7) of device 160, and from port (6) of device 160 via cable 155 to port (4) of switch 110(2). As another example, the AddressA is recorded at port (5) when the packet 185 transmits from port (4) of switch 110(2) via cable 155 to port (6) of device 160, and from port (7) of device 160 via cable 165 to port (5) of switch 110(2).

As an example, the device 160 may be a device in a cubicle of another individual or may be a device in another type of connection. The user 175 will examine the device connected to port (4) or to port (5). In the example network 100 of FIG. 1, the user 175 will determine that the device 160 expected the static address ("AddressA") on port (6), but the static address moved to port (7). The user then determines that port (7) is connected to a device that has already been examined (i.e., device 110(2)). Therefore, the user will disable or remove the connection (link) 165 that is connected to port (7) and port (5) in order to eliminate the loop 170.

As an alternative method in the example network 100, if the static address has moved from the expected port (i.e., port (3) in the example of FIG. 1) and is moving between two other ports on the same device (i.e., port (4) and port (5) in device 110(2)), then either the link 155 connected to port (4) or the link 165 connected to port (5) could be disabled or removed by the user, in order to eliminate the loop problem and then restore the network 100 in a quicker manner.

The user 175 can then perform another check of the network 100 to determine that the loop problem has been eliminated. The user 175 can use the computer 178 to query the user interface 184 of the switch 110(2) to determine that AddressA is no longer moving from port (3) to port (4) or/and port (5). When the loop 170 is eliminated, the AddressA will be detected and recorded on port (3) in this example, since the packet 185 from the device 105 is received on port (3).

The user 175 can use the computer 178 to query the user interface 179 of the switch 110(1) to determine that AddressA is no longer moving from port (1) to port (2) in the switch 110(1). When the loop 170 is eliminated, the AddressA will be detected and recorded on port (1) in this example, since the packet 185 from the device 105 is received on port (1).

In the above method, a known address (e.g., AddressA) of a device is used to detect the loop problem in the network 100. Additionally, normal network packet traffic is observed, in order to detect the network loop problem. Therefore, embodiments of the invention advantageously avoid generating the additional HELLO packet traffic that is required in the STP and RSTP protocols. Additionally, embodiments of the invention advantageously avoid the required blocking (disruption) of normal network packet traffic that is required in the STP and RSTP protocols. In embodiments of the invention, disruption of normal network packet traffic only occurs due to a loop problem, and this traffic disruption is eliminated when the loop problem has been eliminated.

In another embodiment of the invention, the SNMP protocol (simple network management protocol) is used to obtain the recorded MAC address (AddressA) that is received by each port. As known to those skilled in the art, SNMP is a family of protocols (e.g., SNMPv1, SNMPv2, SNMPv3) that relies on an agent residing on the managed device to provide read/write access to data on the managed device. The structure of this data is defined by one or more management information bases (MIBs). Therefore, an SNMP agent 192 can reside in a switch 110 (a managed device) to permit the user to observe movement of AddressA. The user 175 can use a computer 178 to view the movement of AddressA via the SNMP agent 192. Similarly, the switch 110(2) may have an SNMP agent to permit the user to observe the movement of AddressA.

In another embodiment of the invention, the user 175 can observe the movement of AddressA in the ports of a switch 110 by use of a computer 194 with a standard network management tool 196, such as, for example, Procurve Manager, HP Openview, or other suitable network management tools.

FIG. 2 is a block diagram of another example network 200 that can be used to practice another embodiment of the invention. The elements in the network 200 have been similarly described above with reference to the network 100 in FIG. 1. However, the loop problem in the network 200 is the presence of a malfunctioning or misbehaving device 205 which has a loop effect, instead of the presence of an actual network loop. Assume that port (4) of switch 110(2) is connected to a cable (or other types of link) 210 which is connected to the device 205. The device 205 is misbehaving by receiving the packet 185 along cable 210 from switch 110(2) and re-sending the packet 185 along cable 210 to switch 110(2). Assume that the source AddressA of packet 185 is detected and properly recorded on port (3) of switch 110(2) as described above. Since the device 205 is misbehaving by returning packet 185 along cable 210 to the switch 110(2), the port (4) of switch 110(2) will then detect and record the AddressA of packet 185. Since the AddressA has moved from port (3) to port (4) of switch 110(2), a network problem is present in the network 200. The user 175 can use the computer 178 to query the switch 110(2) to determine that AddressA has moved from port (3) to port (4). The user 175 can then determine from the network map that cable 210 from port (4) of switch 110(2) leads to the device 205. The user 175 can then replace the misbehaving device 205 with a properly-functioning device 215 (or arrange the servicing or repair of the misbehaving device 205).

Assuming that the misbehaving device 205 has been repaired or replaced by the properly-functioning device 215, then the packet 185 will no longer travel back to port (4) of switch 110(2) via cable 210. Therefore, the loop problem that is caused by the misbehaving device 205 has been eliminated.

The user 175 can then perform another check of the network 100 to determine that the misbehaving device problem has been eliminated. The user 175 can use the computer 178 to query the switch 110(2) to determine that AddressA is no longer moving from port (3) to port (4). Since the loop problem caused by the device 205 has been eliminated, the AddressA will be detected and recorded on port (3) in this example, since the packet 185 from the device 105 is received on port (3).

Figure 3:
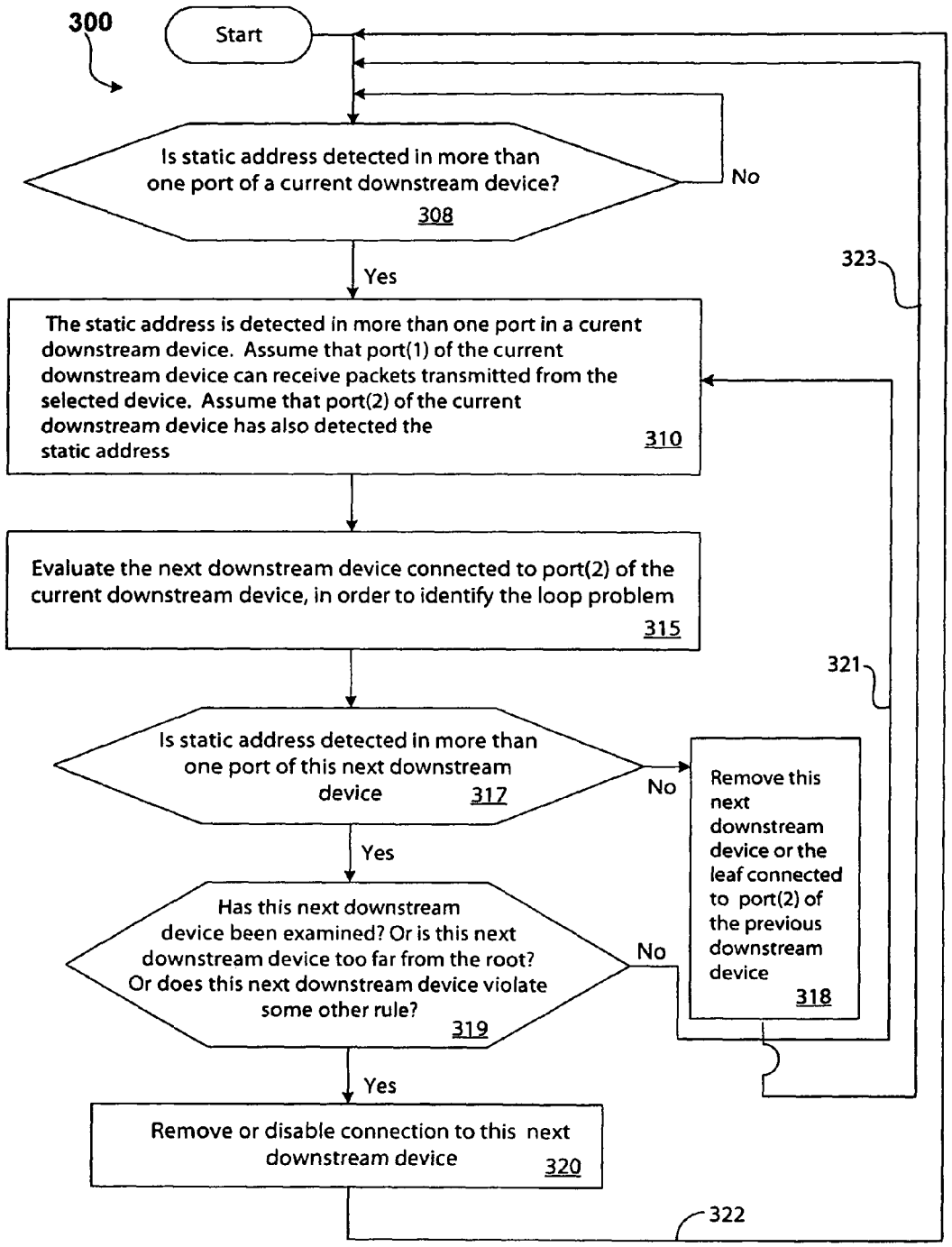
FIG. 3 is a flowchart of a method of detecting and eliminating a loop problem in a network, in accordance with an embodiment of the invention.

FIG. 3 is a flowchart of a method 300 of detecting and eliminating a loop in a network, in accordance with an embodiment of the invention.

In block 308, a current downstream device is evaluated to determine if the static address in a packet is detected in more than one port of the current downstream device. If the static address is not detected in more than one port, then the step of block 308 is again repeated wherein another current downstream device is evaluated to determine if the static address is detected in more than one port of that other downstream device.

On the other hand, in block 308, if the static address is detected in more than one port of the current downstream device, then the method 300 proceeds to steps in block 310 as discussed below.

Therefore, the steps in block 308 is an iterative process where a few or many nodes may need to be evaluated before the user finds a downstream device where the static address is detected in more than one port of the device and where the device might have a connection that needs to be disabled or remove. Traversal of the network may be performed in order to examine additional downstream devices, so that a potential loop problem may be found in the network.

In block 310, the user has already determined that the static address is detected in more than one port in a current downstream device (i.e., a non-leaf and non-root device) (e.g., a switch). Assume that port (1) of the current downstream device can receive packets transmitted from a selected device. However, a direct connection is not required between the current downstream device and the selected device (the selected device is device 105 in the examples of FIGS. 1 and 2). Assume that the static address moved from port (1) to port (2) of the current downstream device. In the examples of FIGS. 1 and 2, this current downstream device is device 110(1).

In block 315, the user evaluates the next downstream device (non-root device) that is connected to port (2) of the current downstream device in order to identify the loop problem. For example, the next downstream device might be a misbehaving device that is sending the packet (with the static address) back to port (2) of the current downstream device. Therefore, the next downstream device in this case is causing a loop problem. As another example, the next downstream device might be detecting the static address in more than one port in the next downstream device. In this second case, the user would trace the elements and cables connected to the ports that are receiving the static address. However, the user does not need to trace the connection from the port (of the next downstream device) (i.e., port 3 in the FIGS. 1 and 2 examples) that is connected to port (2) of the current downstream device. In the examples of FIGS. 1 and 2, this next downstream device is device 110(2).

In block 317, the next downstream device is evaluated to determine if the static address in a packet is detected in more than one port of the next downstream device. If the static address is not detected in more than one port, then the step of block 318 is performed where this next downstream device is removed or replaced, or if the connection to port (2) of the previous downstream device in block 310 is a leaf on the network tree, then that leaf is a misbehaving node and is removed or replaced in block 318. From block 318, the method 300 loops 323 back to block 308 to indicate that the method 300 is a monitoring process that continually executes to detect moves of the static address.

On the other hand, in block 317, if the static address is detected in more than one port of the next downstream device, then the method 300 proceeds to the steps in block 319 as discussed below.

In block 319, various steps are performed as follows. In block 319, if this next downstream device has not been examined, then the method 300 loops 321 back to block 310, and a next downstream device is evaluated in block (315). This loop 321 back to block 310 permits traversal of a large network in order to find a loop-related network problem. On the other hand, in block 319 if this next downstream device has already been examined, then the link to this next downstream device is part of the loop and can be disabled or removed in block 320.

Also, in block 319, if this next downstream device is farther from the root node than expected given the original network topology, then an extra link has been added and this extra link to this next downstream device is removed or disabled in block 320. On the other hand, in block 319, if this next downstream device is not farther from the root node than expected given the original network topology, then the method 300 loops 321 back to block 310.

Also, in block 319, if this next downstream device violates some other rule of the network (for instance, it may be a device on a network that is not supposed to be connected), then the link to this next downstream device is removed or disabled in block 320. On the other hand, in block 319, if this next downstream device does not violate some other rule of the network, then the method 300 loops 321 back to block 310.

In block 320, the user will remove or disable the connection to the next downstream device. From block 320, the method 300 loops 321 back to block 308 to indicate that the method 300 is a monitoring process that continually executes to detect moves of the static address. If multiple loops in the network form simultaneously, then multiple passes of the method 300 are necessary in order to find each of the loops.

Note that when the static address is now only being detected in one port in each of the downstream devices, then this condition indicates that the loop problem has been eliminated in the network.

Note that in block 319, the next downstream device is not examined if: (1) the current downstream device is a leaf, (2) if the current downstream device has already been examined (i.e., there is a possibility that the next downstream device is the same current downstream device, for example, when 2 ports on the same current downstream device are connected to each other), or (3) when there is a traversal is made beyond the maximum expected distance from the root node.

Various elements in the drawings may be implemented in hardware, software, firmware, or a combination thereof.

The various engines or software discussed herein may be, for example, computer software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters (e.g., port names or address names) shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for detecting a network loop problem in a network, the method comprising:
   selecting a known static address of a selected device which should normally be detected at not more than one port of a downstream device;
   determining if the static address is detected in more than one port in a current downstream device, wherein the current downstream device includes a first port which normally detects the known static address and a second port;
   if the static address is detected at the second port of the current downstream device, then determining a connection to the second port; and
   if the connection to the second port is a leaf of a tree of the network, then identifying the leaf as a misbehaving node, and if the connection to the second port is not a leaf, then evaluating a next downstream device.

2. The method of claim 1, further comprising:
if the connection to the second port is not a leaf and the static address is detected in only one port of the next downstream device, then removing the next downstream device connected to the second port of the current downstream device.

3. The method of claim 1, further comprising:
if the connection to the second port is not a leaf and the static address is detected in more than one port of the next downstream device, then removing or disabling a link to the next downstream device if the next downstream device is farther from the current downstream device than expected in the network's original topology.

4. The method of claim 1, further comprising:
if the connection to the second port is not a leaf and the static address is detected in more than one port of the next downstream device, then removing or disabling a link to the next downstream device since the link is part of the network loop problem, if the next downstream device has already been examined.

5. The method of claim 1, further comprising:
if the connection to the second port is not a leaf and the static address is detected in more than one port of the next downstream device, then removing or disabling a link to the next downstream device if the next downstream device violates a rule of the network since the link is part of the network loop problem.

6. The method of claim 1, further comprising:
determining if the static address is only detected in one port in each of the downstream devices.

7. The method of claim 1, wherein the network loop problem comprises one of: a network loop formed by a downstream device connected to itself by a link, two downstream devices connected by multiple links, or a ring of downstream devices where each downstream device is connected to two other downstream devices by a single link.

8. The method of claim 1, wherein the network loop problem comprises: the next downstream devices misbehaving by transmitting the packet with the static address from the next downstream device to the second port of the current downstream device.

9. The method of claim 1, wherein the static address is a MAC (Media Access Control) address of the selected device.

10. The method of claim 1, wherein the static address is indicated in an Ethernet frame that is transmitted by the selected device.

11. The method of claim 1, wherein determining if the static address is detected in more than one port in the current downstream device comprises:
observing a movement of the static address by use of a user interface in the current downstream device.

12. The method of claim 1, wherein determining if the static address is detected in more than one port in the current downstream device comprises:
observing a movement of the static address by use of simple network management protocol (SNMP).

13. The method of claim 1, wherein determining if the static address is detected in more than one port in the current downstream device comprises:
observing a movement of the static address by use of a network management tool that can communicate with the network that includes the current downstream device.

14. The method of claim 1, wherein the static address is recorded in a port by use of an address table.

15. The method of claim 1, wherein the selected device comprises: a network device that generates network packet traffic with packets containing the static address.

16. The method of claim 1, wherein the selected device comprises one of a router, server, or network switch.

17. A network that permits detection of a network loop problem, the network comprising:
a selected device;
a current downstream device; and
a next downstream device;
wherein a user selects a known static address of the selected device which should normally be detected at not more than one port of a downstream device; the user determines if the static address is detected in more than one port in the current downstream device, wherein the current downstream device includes a first port which normally detects the known static address and a second port; if the static address is detected at the second port of the current downstream device, then the connection to the second port is determined; and if the connection to the second port is a leaf, then the leaf is identified as a misbehaving node, and if the connection to the second port is not a leaf, then the next downstream device is evaluated.

18. The network of claim 17, wherein if the connection to the second port is not a leaf and the static address is detected in only one port of the next downstream device, then the next downstream device connected to the second port of the current downstream device is removed.

19. The network of claim 18, wherein if the connection to the second port is not a leaf and the static address is detected in more than one port of the next downstream device, then a link to the next downstream device is removed or disabled, if the next downstream device is farther from the current downstream device than expected in the network's original topology.

20. The network of claim 18, wherein if the connection to the second port is not a leaf and the static address is detected in more than one port of the next downstream device, then a link to the next downstream device is removed or disabled if the next downstream device has already been examined.

21. The network of claim 18, wherein if the connection to the second port is not a leaf and the static address is detected in more than one port of the next downstream device, then a link to the next downstream device is removed or disabled, if the next downstream device violates a rule of the network since the link is part of the network loop problem.

22. The network of claim 18, wherein the user determines if the static address is only detected in one port in each of the downstream devices.

23. The network of claim 18, wherein the network loop problem comprises one of: a network loop formed by a downstream device connected to itself by a link, two downstream devices connected by multiple links, or a ring of downstream devices where each downstream device is connected to two other downstream devices by a single link.

24. The network of claim 18, wherein the network loop problem comprises: the next downstream devices misbehaving by transmitting the packet with the static address from the next downstream device to the second port of the current downstream device.

25. The network of claim 18, wherein the static address is a MAC (Media Access Control) address of the selected device.

26. The network of claim 18, wherein the static address is indicated in an Ethernet frame that is transmitted by the selected device.

27. The network of claim 18, wherein the user determines if the static address is detected in more than one port in the current downstream device by observing a movement of the static address by use of a user interface in the current downstream device.

28. The network of claim 18, wherein the user determines if the static address is detected in more than one port in the current downstream device by observing a movement of the static address by use of simple network management protocol (SNMP).

29. The network of claim 18, wherein the user determines if the static address is detected in more than one port in the current downstream device by observing a movement of the static address by use of a network management tool that can communicate with the network that includes the current downstream device.

30. An apparatus for detecting a network loop problem in a network, the apparatus comprising:
   means for determining if a static address is detected in more than one port in a current downstream device, wherein the current downstream device includes a first port which normally detects the known static address and a second port;
   wherein if the static address is detected at the second port of the current downstream device, then determining the connection to the second port and wherein if the connection to the second port is a leaf of a tree of the network, then identifying the leaf as a misbehaving node, and if the connection to the second port is not a leaf, then evaluating a next downstream device.

* * * * *

UNITED STATES PATENT AND TRADEMARK OFFICE
CERTIFICATE OF CORRECTION

| | | |
|---|---|---|
| PATENT NO. | : 7,843,854 B2 | Page 1 of 1 |
| APPLICATION NO. | : 11/346916 | |
| DATED | : November 30, 2010 | |
| INVENTOR(S) | : VanZante | |

It is certified that error appears in the above-identified patent and that said Letters Patent is hereby corrected as shown below:

In column 12, line 5, in Claim 16, delete "of" and insert -- of: --, therefor.

Signed and Sealed this
Eighth Day of November, 2011

David J. Kappos
*Director of the United States Patent and Trademark Office*